US011449828B2

(12) United States Patent
Bryan et al.

(10) Patent No.: US 11,449,828 B2
(45) Date of Patent: Sep. 20, 2022

(54) SYSTEM AND METHOD FOR MANAGEMENT OF PERPETUAL INVENTORY VALUES BASED UPON CONFIDENCE LEVEL (71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 237 days.

(21) Appl. No.: 16/932,284

(22) Filed: Jul. 17, 2020

(65) Prior Publication Data

US 2020/0349499 A1    Nov. 5, 2020

Related U.S. Application Data (63) Continuation of application No. 15/975,233, filed on May 9, 2018, now abandoned.

(60) Provisional application No. 62/511,555, filed on May 26, 2017.

(51) Int. Cl.
*G06Q 10/08* (2012.01)
*G05D 1/02* (2020.01)

(52) U.S. Cl.
CPC ........... *G06Q 10/087* (2013.01); *G05D 1/021* (2013.01); *G05D 1/0202* (2013.01); *G05D 2201/0216* (2013.01)

(58) Field of Classification Search
None
See application file for complete search history.

(56) References Cited

U.S. PATENT DOCUMENTS

| 5,963,919 A | 10/1999 | Brinkley |
| 6,681,990 B2 | 1/2004 | Vogler |
| 6,726,099 B2 | 4/2004 | Becker |
| 6,758,403 B1 | 7/2004 | Keys |
| 7,084,769 B2 | 8/2006 | Bauer |

(Continued)

FOREIGN PATENT DOCUMENTS

| CA | 2682886 | 4/2010 |
| CN | 204270352 U | 4/2015 |

(Continued)

OTHER PUBLICATIONS

"Improve Productivity and Customer Service in the Retail Store With Automated Inventory Management: The MC2100 in retail"; Zebra Technologies; Apr. 2015; pp. 1-6.

(Continued)

*Primary Examiner* — Paul Danneman
(74) *Attorney, Agent, or Firm* — Fitch, Even, Tabin & Flannery LLP (57) ABSTRACT

A priority is dynamically assigned to each of the inventory-related values. A confidence score is determined based upon an evaluation of all of the prioritized inventory-related values. Based upon the confidence score, one or more PI programs for the retail store is authorized for utilization. The number of inventory-related values used and the priorities for these values are dynamically changeable.

18 Claims, 5 Drawing Sheets

(56) References Cited

U.S. PATENT DOCUMENTS

| | | |
|---|---|---|
| 7,222,786 B2 | 5/2007 | Renz |
| 7,370,005 B1 | 5/2008 | Ham |
| 7,480,623 B1 | 1/2009 | Landvater |
| 7,552,066 B1 | 6/2009 | Landvater |
| 7,616,117 B2 | 11/2009 | Streeb |
| 7,693,757 B2 | 4/2010 | Zimmerman |
| 7,788,119 B2 | 8/2010 | Najmi |
| 7,792,709 B1 | 9/2010 | Trandal |
| 7,950,579 B2 | 5/2011 | Gray |
| 7,954,712 B2 | 6/2011 | Babcock |
| 8,091,782 B2 | 1/2012 | Cato |
| 8,107,736 B2 | 1/2012 | Brown |
| 8,189,855 B2 | 5/2012 | Opalach |
| 8,191,672 B2 | 6/2012 | Kondo et al. |
| 8,195,533 B1 | 6/2012 | Mishra |
| 8,224,717 B2 | 7/2012 | Giacobbe |
| 8,260,456 B2 | 9/2012 | Siegel |
| 8,321,302 B2 | 11/2012 | Bauer |
| 8,321,303 B1 | 11/2012 | Krishnamurthy |
| 8,346,630 B1 | 1/2013 | McKeown |
| 8,423,431 B1 | 4/2013 | Rouaix |
| 8,521,620 B2 | 8/2013 | Livingston |
| 8,577,136 B1 | 11/2013 | Ascher |
| 8,616,822 B2 | 12/2013 | Winkler |
| 8,732,039 B1 | 5/2014 | Chen |
| 8,965,796 B1 | 2/2015 | Gala |
| 9,120,622 B1 | 9/2015 | Elazary |
| 9,165,277 B2 | 10/2015 | Jones |
| 9,171,278 B1 | 10/2015 | Kong |
| 9,205,886 B1 | 12/2015 | Hickman |
| 9,280,757 B2 | 3/2016 | Parpia |
| 9,378,484 B1 | 6/2016 | Russell |
| 9,415,935 B1 | 8/2016 | Macfarlane |
| 9,758,301 B2 | 9/2017 | Porat |
| 10,019,803 B2 | 7/2018 | Venable |
| 10,089,055 B1 | 10/2018 | Fryman |
| 10,130,177 B2 | 11/2018 | Jones |
| 10,130,232 B2 | 11/2018 | Atchley |
| 10,138,060 B1 | 11/2018 | Mantha |
| 10,169,738 B2 | 1/2019 | Jones |
| 10,189,642 B2 | 1/2019 | High |
| 10,192,157 B2 | 1/2019 | Cote |
| 10,289,990 B2 | 5/2019 | Rizzolo |
| 10,311,400 B2 | 6/2019 | Mascorro Medina |
| 10,360,548 B2 | 7/2019 | Brooks |
| 10,373,116 B2 | 8/2019 | Medina |
| 10,453,009 B2 | 10/2019 | Ulrich |
| 10,467,587 B2 | 11/2019 | Bogolea |
| 10,489,677 B2 | 11/2019 | Rzeszutek |
| 10,505,057 B2 | 12/2019 | Haist |
| 10,546,258 B2 | 1/2020 | Jones |
| 10,552,792 B2 | 2/2020 | Mattingly |
| 10,558,947 B2 | 2/2020 | Bryan |
| 2001/0047293 A1 | 11/2001 | Waller |
| 2002/0138336 A1 | 9/2002 | Bakes |
| 2002/0174001 A1 | 11/2002 | Henry |
| 2003/0216969 A1 | 11/2003 | Bauer |
| 2003/0233277 A1 | 12/2003 | Saunders |
| 2004/0158507 A1 | 8/2004 | Meek |
| 2006/0157150 A1 | 7/2006 | Blakeslee |
| 2007/0021864 A1 | 1/2007 | Mountz |
| 2007/0144991 A1 | 6/2007 | Hansl |
| 2008/0077510 A1 | 3/2008 | Dielemans |
| 2008/0120205 A1 | 5/2008 | Hoopes |
| 2008/0255968 A1 | 10/2008 | Heinrichs |
| 2008/0270269 A1 | 10/2008 | Myers |
| 2009/0060349 A1 | 3/2009 | Linaker |
| 2009/0063310 A1 | 3/2009 | Alonzo |
| 2009/0101713 A1 | 4/2009 | Ulrich |
| 2009/0157533 A1 | 6/2009 | Ohno |
| 2010/0106609 A1 | 4/2010 | Sherman |
| 2010/0138037 A1 | 6/2010 | Adelberg |
| 2012/0209734 A1 | 8/2012 | Brooks |
| 2012/0259655 A1 | 10/2012 | Madreperla |
| 2012/0310781 A1 | 12/2012 | Battle |
| 2013/0018696 A1 | 1/2013 | Meldrum |
| 2013/0211870 A1 | 8/2013 | Lawson |
| 2014/0006131 A1 | 1/2014 | Causey |
| 2014/0006229 A1 | 1/2014 | Birch |
| 2014/0100769 A1 | 4/2014 | Wurman |
| 2014/0143039 A1 | 5/2014 | Branton |
| 2014/0180865 A1 | 6/2014 | Argue |
| 2014/0201042 A1 | 7/2014 | Meyer |
| 2014/0247116 A1 | 9/2014 | Davidson |
| 2014/0344118 A1* | 11/2014 | Parpia .................. G06Q 10/087 705/28 |
| 2014/0379535 A1 | 12/2014 | Briet |
| 2015/0039373 A1 | 2/2015 | Anand |
| 2015/0178654 A1 | 6/2015 | Glasgow |
| 2015/0235157 A1 | 8/2015 | Avegliano |
| 2015/0242805 A1 | 8/2015 | Sakurai |
| 2015/0379366 A1 | 12/2015 | Nomura |
| 2016/0042315 A1* | 2/2016 | Field-Darragh ..... H04B 5/0062 705/28 |
| 2016/0114488 A1 | 4/2016 | Mascorro Medina |
| 2016/0132823 A1 | 5/2016 | Swafford |
| 2016/0132910 A1 | 5/2016 | Appel |
| 2016/0171428 A1 | 6/2016 | Gooijer |
| 2016/0371613 A1 | 12/2016 | Ulrich |
| 2017/0148005 A1 | 5/2017 | Murn |
| 2017/0155788 A1 | 6/2017 | Kobayashi |
| 2017/0193430 A1 | 7/2017 | Barreira Avegliano |
| 2017/0200106 A1 | 7/2017 | Jones |
| 2018/0005174 A1 | 1/2018 | Dixon |
| 2018/0060804 A1 | 3/2018 | Cheruku |
| 2018/0089613 A1 | 3/2018 | Chen |
| 2018/0268355 A1 | 9/2018 | Bryan |
| 2018/0268356 A1 | 9/2018 | Bryan |
| 2018/0268364 A1 | 9/2018 | Bryan |
| 2018/0268366 A1 | 9/2018 | Bryan |
| 2018/0268367 A1 | 9/2018 | Bryan |
| 2018/0268509 A1 | 9/2018 | Bryan |
| 2018/0341906 A1 | 11/2018 | Bryan |
| 2019/0073775 A1 | 3/2019 | Lam |
| 2019/0149725 A1 | 5/2019 | Adato |
| 2019/0215424 A1 | 7/2019 | Adato |
| 2019/0291954 A1 | 9/2019 | Lee |
| 2019/0303863 A1 | 10/2019 | Ghosh |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

"SHELF Monitor"; Tech Mahindra; https://www.techmahindra.com/industries/Enterprise/retail_and_cpg/retail/solutions/shelf_monitor.aspx; 2016; pp. 1-1.

Angell, Robert C., "Control of State-Wide Liquor Inventories", National Association of Cost Accountants; NACA Bulletin (pre-1986); Feb. 15, 1948; pp. 1-9.

Bourzac, Katherine; "A Robot Takes Stock"; https://www.technologyreview.com/s/428374/arobottakesstock/; Published Jun. 29, 2012; pp. 1-4.

Fraunhofer; "The flying inventory assistant"; http://www.fraunhofer.de/en/press/research-news/2014/december/the-flying-inventoryassistant.html; Published Dec. 1, 2014; pp. 1-3.

Gruen, Thomas W., et al.; "A Comprehensive Guide To Retail Out-of-Stock Reduction In the Fast-Moving Consumer Goods Industry"; 2007; 71 pgs.

Kang, Yun, et al.; "Information Inaccuracy in Inventory Systems—Stock Loss and Stockout"; Massachusetts Institute of Technology; Published Aug. 23, 2004; 29 pages.

Lowe's Home Improvement; "Lowe's Introduces LoweBot"; https://www.youtube.com/watch? v=hP3yfGHTXFo; Published on Aug. 30, 2016; pp. 1-10.

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

(56) References Cited

OTHER PUBLICATIONS

Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.

PCT; App. No. PCT/US2018/033135; International Search Report and Written Opinion dated Aug. 3, 2018.

SAP; "How to Set Up and Manage a Perpetual Inventory System"; SAP; Jun. 22, 2016; pp. 1-108.

Stuart, Sophia; "Meet Tally, the Robot That Knows What's on Store Shelves"; http://in.pcmag.com/roboticsautomation/99587/news/meettallytherobotthatknowswhatsonstoreshelves; Published Jan. 27, 2016; pp. 1-8.

Trujillo, Paul; "Walmart is Addressing Inventory Problems With a New System"; http://www.waspbarcode.com/buzz/walmart-2/; Nov. 15, 2016; pp. 1-7.

Vanian, Jonathan; "Target's New Robot Helper is Busy at Work on Aisle 3"; http://fortune.com/2016/04/28/targettestingrobotinventorysimbe/; Published Apr. 28, 2016; pp. 1-8.

Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

\* cited by examiner

FIG. 5 great SYSTEM AND METHOD FOR MANAGEMENT OF PERPETUAL INVENTORY VALUES BASED UPON CONFIDENCE LEVEL

CROSS-REFERENCE TO RELATED APPLICATIONS

This application is a continuation application of U.S. application Ser. No. 15/975,233, filed May 9, 2018, which claims the benefit of U.S. Provisional Application No. 62/511,555, filed May 26, 2017, both of which are incorporated herein by reference in their entireties.

TECHNICAL FIELD

This invention relates generally to the management of perpetual inventory values, and more particularly, to allowing a retail store to manage perpetual inventory values.

BACKGROUND

Various approaches and values are utilized to track the exact amount of products present in a retail store. Among other things, the amount of a product that is available in the store may be used in determining when to re-order the product from a supplier, and the popularity of the product.

Perpetual inventory (PI) values are one type of indicator used to track product availability. PI values generally relate to the amount of a selected product available at a retail store.

Sometimes, PI values become inaccurate. Since PI values are used as inputs to other processes, incorrect PI values can lead to inefficient operation of the store. For instance, products are sometimes re-ordered based upon PI values. In another example, an item may need to be retrieved in the store. A store employee (or autonomous vehicle) may be asked to find an item to satisfy a customer requests based on a PI value that indicates that product is present in the store.

Adjustments may be made to the PI values for particular products at the store. However, if the retail store is known to make incorrect decisions or is in any other way unreliable, the retail store's adjustment to the PI may be unreliable. Worse, in these circumstances, the store's adjustment to the PI may increase the inaccuracy of an already incorrect PI, and this can lead to further problems.

BRIEF DESCRIPTION OF THE DRAWINGS

Disclosed herein are embodiments of systems, apparatuses and methods pertaining to managing perpetual inventory values. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that determine a level of confidence in how much trust the retail store is given in making PI adjustments. How well the store has followed pre-defined processes, the store type, and/or the store location, to mention a few example factors, determine the confidence level. The confidence level may be mapped to a particular suite of PI adjustment programs with each suite having a set of checks and balances associated with the confidence level. In other words, once the confidence level is determined, a mapping of the confidence level to the particular grouping of PI adjustment programs is made, and then these programs are executed.

In many of these embodiments, a system that determines the application of perpetual inventory (PI) adjustment programs in retail stores includes a network, a retail store, an interface, a database, and a control circuit. The retail store includes a transmitter that is configured to transmit one or more inventory-related values from a retail store to the network. The interface is coupled to the network and disposed at a central processing center. The interface has a transceiver that receives the one or more inventory-related values from the retail store via the network. The database is configured to store the inventory-related values.

The control circuit is coupled to the database and disposed at the central processing center. The control circuit is configured to receive the inventory-related values from the database and dynamically assign a priority to each of the inventory-related values. The control circuit is further configured to determine a confidence score based upon an evaluation of all of the prioritized inventory-related values. Based upon the confidence score, the control circuit is configured to select and authorize utilization of one or more PI programs for the retail store. The number of inventory-related values used and the priorities for these values are dynamically changeable.

The inventory-related values are values such as those related to shelf availability, back room binning activity, on-shelf customer availability, an inventory value, a forecast accuracy, a sales volume, a turnover amount, a store manager verification of under stock or overstock, a percentage of inventory in a back room, a store size, a store size class, and a store inventory accuracy. Other examples are possible.

In aspects, the score is determined by the control circuit based upon a weighted sum of the prioritized inventory-related values. In examples, the control circuit determines a scaled value for each of the prioritized inventory-related values.

In other examples, selected ones of the PI adjustment programs perform a verification of whether the product is located in the retail store. In other examples, the verification is performed at least in part by an automated vehicle. In other examples, the automated vehicle is an aerial drone or an automated ground vehicle.

In others of these embodiments, one or more inventory-related values is transmitted from a retail store to a central processing center via a network. The one or more inventory-related values are received from the retail store at the central processing center, and the inventory-related values are stored in a database. A priority is dynamically assigned to each of the inventory-related values. A confidence score is determined based upon an evaluation of all of the prioritized inventory-related values. Based upon the confidence score, one or more PI programs for the retail store is authorized for utilization. The number of inventory-related values used and the priorities for these values are dynamically changeable, for example, by users.

In still others of these embodiments, a system determines the application of perpetual inventory (PI) adjustment programs in retail stores. The system includes an electronic communication network, a retail store, a plurality of electronic sensors disposed at the retail store, an interface, a database, and a control circuit.

The retail store includes a transmitter that is configured to transmit one or more inventory-related values obtained by the sensors from the retail store to the network. The interface is coupled to the network and disposed at a central processing center. The interface has a transceiver circuit that receives the one or more inventory-related values or data from the retail store via the network. At least some of the inventory-related values have a time stamp. In aspects, the time stamp indicates when a process was used or when the inventory-related value was obtained. The database is configured to store the inventory-related values.

The control circuit is coupled to the database. The control circuit is disposed at the central processing center and is configured to receive the inventory-related values from the database; dynamically assign a priority to each of the inventory-related values; determine a confidence score based upon an evaluation of all of the prioritized inventory-related values, the score determined based at least in part upon an evaluation of time stamps of some of the inventory-related values; and, based upon the confidence score, select and authorize utilization of one or more PI programs for the retail store. The PI program is chosen using a data structure in the database that maps dynamically changeable confidence scores to dynamically changeable suites of PI programs.

Selected ones of the PI programs perform a verification of whether the product is located in the retail store. The verification is performed by an automated vehicle that has a sensing device to determine whether the product is in the retail store. The number of inventory-related values used and the priorities for these values are dynamically changeable.

Figure 1:
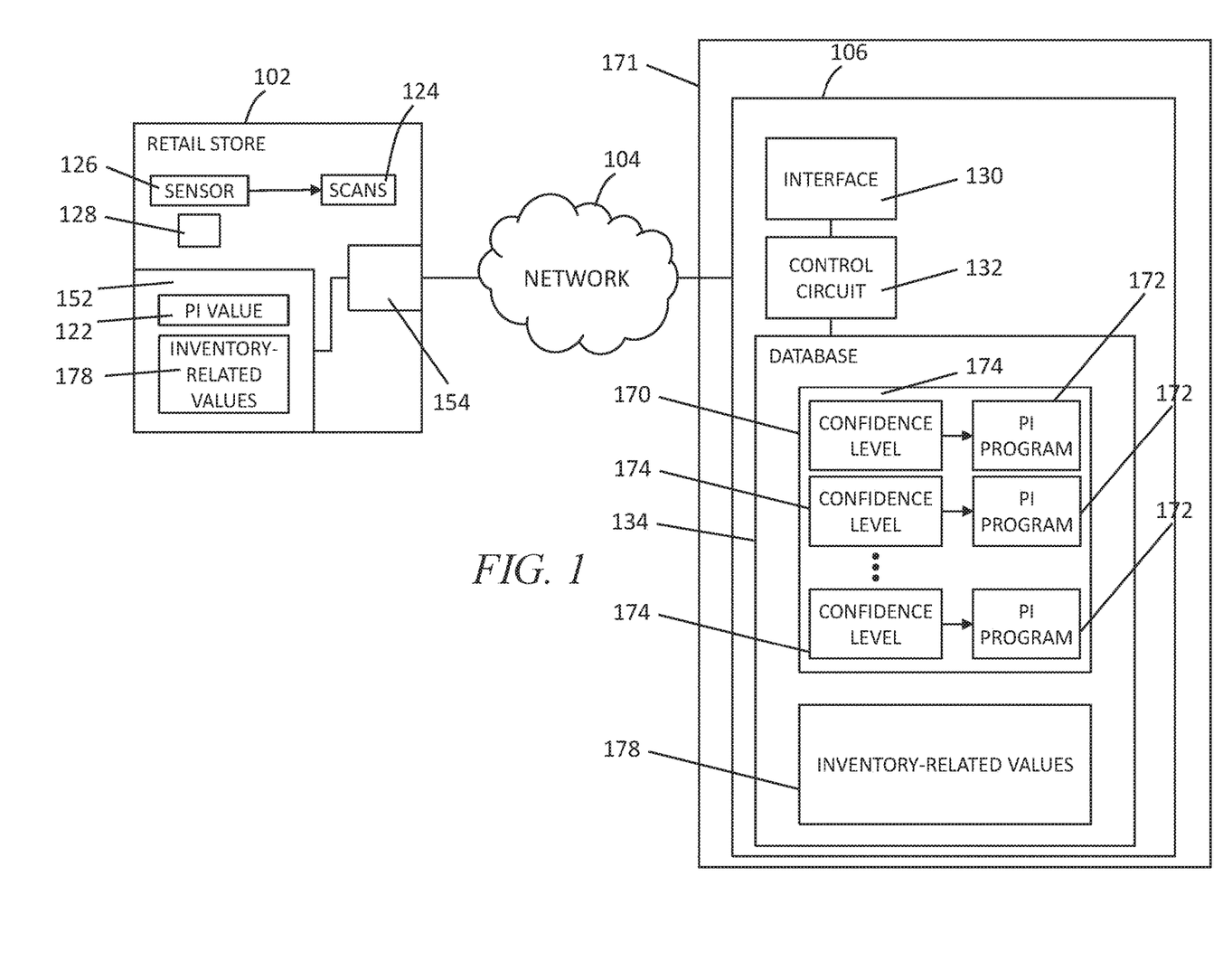
FIG. 1 is a block diagram of a system for allowing a retail store to change the PI value in accordance with some embodiments.

Referring now to FIG. 1, one example of a system 100 for determining a level of confidence in how much trust a retail store 102 is given in making PI adjustments is described. The retail store 102 may be any type of retail store, for example, a discount center, a grocery store, a department store, or a hardware store to mention a few examples.

The retail store includes a database 152 that stores for each product a PI value 122. The PI value 122 for the selected product indicates the amount of a selected product in the retail store. Sensors 126 obtain scans 124 of products in the store. The PI value 122 may be adjusted by one or more PI adjustment programs.

The database 152 stores inventory-related values 178. In aspects, these values relate to shelf availability of a product, back room binning activity for a product, on-shelf customer availability of a product, an inventory value of a product, a forecast accuracy, a sales volume of a product, a turnover amount, a store manager verification of under stock or overstock, a percentage of inventory in a back room, a store size, a store size class, and a store inventory accuracy. Other examples are possible.

In some examples, at least some of the inventory-related values have a time stamp. In aspects, the time stamp indicates when a process was used or when the inventory-related value was obtained. For example, the time stamps may be used to determine when a retail store executed a process, or when data was produced.

Scans 124 may be utilized to obtain some of the inventory-related values 178. For example, shelf availability of a product 128 may be determined by the scans 124. In examples, the scans 124 are scans of a retail shelf, scans of a top shelf capacity, and scans of a back room. In other examples, the sensor is a camera that obtains visible images.

A communication device 154 allows the retail store 102 to communicate with devices and entities that are external to the store. The communication device 154 may include any combination of hardware or software that allows communications to be received at the retail store 102, and makes transmissions from the retail store 102. In one example, the communication device 154 may be a transceiver circuit. The communication device 154 may be deployed within or at another device (e.g., a modem, a smart phone, or a personal computer, to mention a few examples). In aspects, the communication device 154 transmits the inventory-related values 178 to the network 104.

Network 104 is coupled to the communication device 154 (e.g., a transceiver) at the retail store 102. The network 104 may be any type of computer or communication network (such as the cloud) and may include routers, gateways, and servers to mention a few examples of devices that can form or be utilized in the network 104. The network 104 may also be combinations of various types of networks.

The apparatus 106 includes an interface 130, a control circuit 132, and a database 134. The interface 130 is configured to receive from the retail store 102 the perpetual inventory (PI) value 122 associated with the selected product.

The database 134 stores a data structure 170 and a plurality of PI adjustment programs 172 at a central processing center 171. The data structure 170 programmatically maps confidence levels 174 to selected ones of the PI adjustment programs 172. Inventory-related values 178 are also stored at the database.

The inventory-related values 178 may relate to shelf availability, back room binning activity, on-shelf customer availability, an inventory value, a forecast accuracy, a sales volume, a turnover amount, a store manager verification of under stock or overstock, a percentage of inventory in a back room, a store size, a store size class, and a store inventory accuracy. As mentioned, a time stamp may also be included or be associated with some or all of the inventory-related values (e.g., some of the values 178 indicate a PI verification procedure has been performed and a time stamp associated with these values indicates when the procedure was performed). Other examples are possible.

As mentioned, the sensor 126 obtains scans 124 of products 128. The sensor 126 may be any type of sensing device such as a camera that obtains images, and may be fixed in location or mounted on a moving vehicle (e.g., an aerial drone or an automated ground vehicle). The scans 124 may be any type of image in any type of image or image file format. The products 128 are any type of products that may be sold at a retail store.

The control circuit 132 is coupled to the interface 130 and the database 134. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The control circuit 132 is coupled to the interface 130 and the database 134, and is also disposed at the central processing center 171. The control circuit 132 is configured to receive the inventory-related values 178 from the database 134 and dynamically assign a priority to each of the inventory-related values 178. The dynamic assignment may be accomplished by receiving user input, for instance, from a user device coupled to the network 104. The control circuit 132 is further configured to determine a confidence score based upon an evaluation of all of the prioritized inventory-related values 178. Based upon the confidence score, the control circuit 132 is configured to select and authorize utilization of one or more PI programs for the retail store. The number of inventory-related values used in the analysis and the priorities for these values in the analysis are dynamically changeable. For example, a user may from an appropriate data entry device (e.g., coupled to the network 104), change the number and priority of the values 178 used in the analysis.

In aspects, the score is determined by the control circuit 132 based upon a weighted sum of the prioritized inventory-related values. In examples, the control circuit 132 determines a scaled value or amount for each of the prioritized inventory-related values.

Advantageously, the use of a time stamp allows filtering of data by the control circuit 132. With a use of a time stamp, only data from certain times or occurring (stamped) as being obtained at certain time periods needs to be processed or analyzed under some circumstances. As a result, the control circuit 132 operates more efficiently and/or quickly by not having to process all data. Decisions can also be reached by the control circuit 132 more quickly and/or efficiently. In one specific example, the system may only care about certain time periods and the use of a time stamp on all data advantageously allows data or inventory-related values occurring outside the time period(s) to be ignored.

The time stamp may be included or incorporated into the inventory-related values 178, indicating when these values were obtained or when the process related to these values was executed or performed. In aspects, less confidence is determined when a procedure is performed at an unexpected time, an unscheduled time, an inappropriate time, or a time that is counter to store rules, store regulations, or store procedures. The time stamp may be any appropriate electronic marking associated or incorporated with the inventory-related values 178.

The PI adjustment programs 172 are in aspects software routines (sequences of computer instructions that are executed on a general-purpose computer). Each of the programs 172 may utilize a different approach to adjusting PI. For example, each may seek to verify certain information before a PI change is made. In one example of when a nil pick occurs, there may be one verification that the nil pick is real (e.g., by a robot that takes pictures) verifying that the product is not there in the store. In another example, no verifications are required. In examples, the robot is an automated vehicle such as an aerial drone or an automated ground vehicle.

In one example and once selected and authorized to be used, the PI adjustment programs 172 may be downloaded to the retail store 102 and stored in the database 152 for execution. In other aspects, the programs 172 are already present in the database 152, but only executed when enabled. In yet other examples, the programs 172 are executed at the central processing center 172 and adjust the PI value 122 in the database 152.

Figure 2:
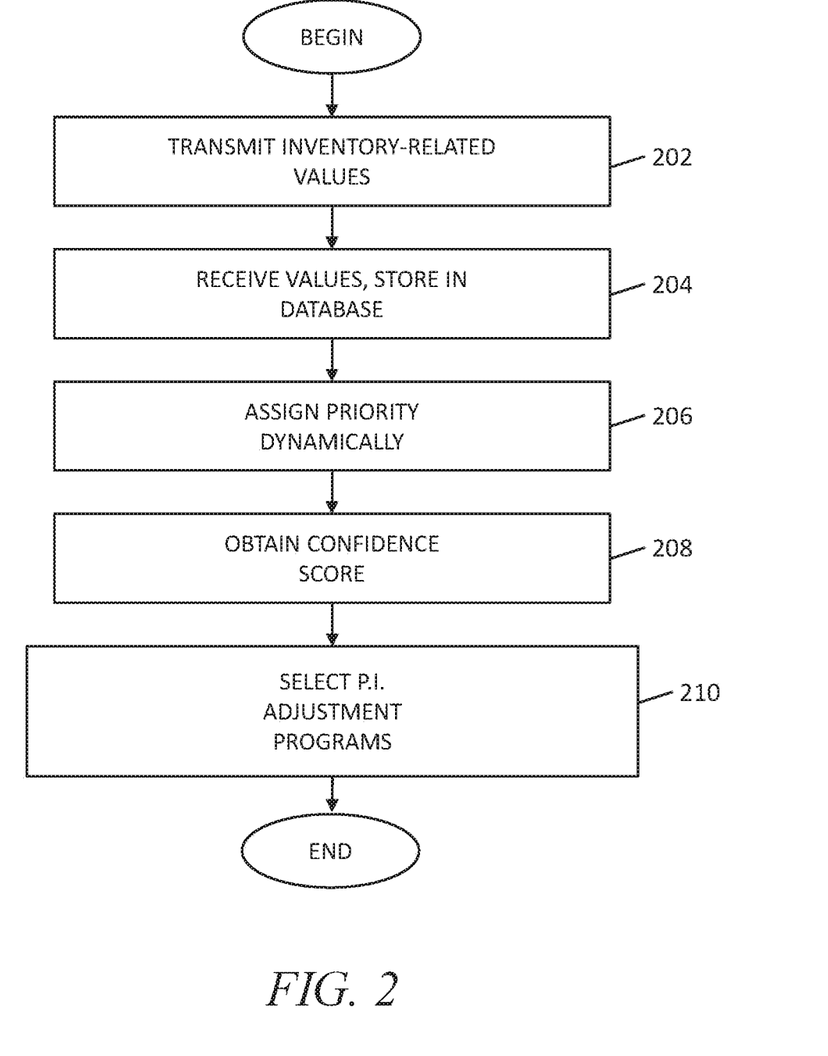
FIG. 2 is a flow chart of an approach for allowing a retail store to change the PI value in accordance with some embodiments.

Referring now to FIG. 2, one example of an approach for determining a level of confidence in how much trust a retail store is given in making PI adjustments is described. At step 202, one or more inventory-related values are transmitted from a retail store to a central processing center via a network. The inventory-related values are values such as those related to shelf availability, back room binning activity, on-shelf customer availability, an inventory value, a forecast accuracy, a sales volume, a turnover amount, a store manager verification of under stock or overstock, a percentage of inventory in a back room, a store size, a store size class, and a store inventory accuracy.

At step 204, the one or more inventory-related values are received from the retail store at the central processing center, and stored in a database. At step 206, a priority is dynamically assigned to each of the inventory-related values. The priority may be determined by input received from a user. For example, a user may use a computer terminal or smart device to enter the values to be used and the priority of these values.

At step 208, a confidence score is determined based upon an evaluation of all of the prioritized inventory-related values. The values that are to be used in the confidence determination may also be selected by the user. In aspects, the score is determined by obtaining a weighted sum of the prioritized inventory-related values. It will be appreciated that different stores may be strong in some categories of performance and weak in other categories. As such, stores may end up receiving the same confidence scores or approximately the same score) despite the differences.

In other examples, a time stamp may be used to filter data and obtain data from only certain time periods. In one aspect, such data can be evaluated to determine if a procedure (e.g., unloading a truck) was performed during a certain time. If the procedure is performed during the correct time, the confidence score may be set or adjusted to be higher than if the procedure was not performed during the correct time.

At step 210 and based upon the confidence score, one or more PI programs for the retail store are authorized for utilization. The number of inventory-related values used and the priorities for these values are dynamically changeable. In one examples, a look-up table may be used to map confidence levels to particular PI adjustment programs (or groups of PI adjustment programs). The one or more identified PI adjustment programs are then executed. The PI programs may be sets of computer instructions executed on general purpose processing devices.

Figure 3:
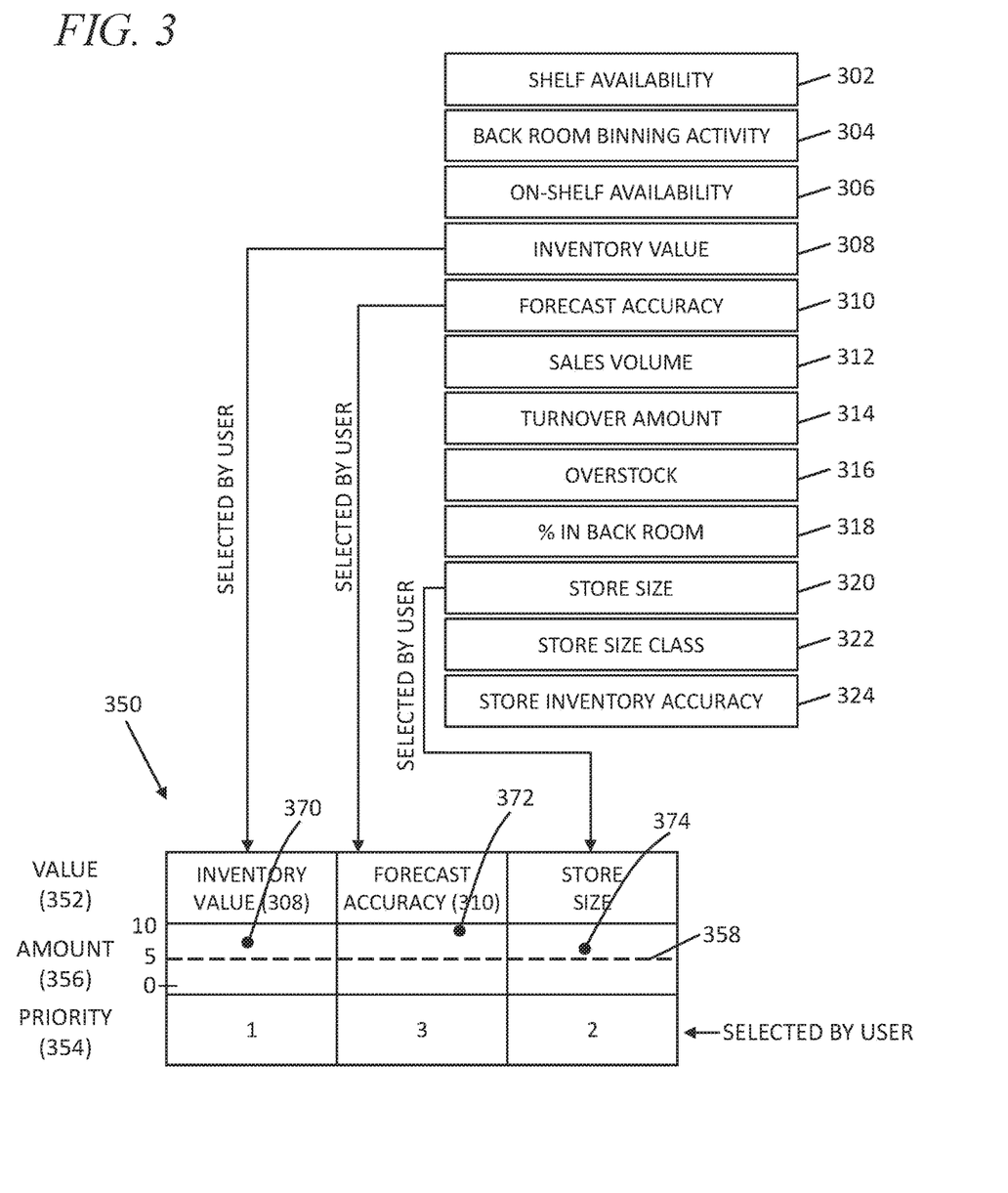
FIG. 3 is a diagram of an approach for determining a confidence level in accordance with some embodiments.

Referring now to FIG. 3, one example of an approach for determining a confidence level is described. Inventory-related values are received or obtained. The inventory-related values may be obtained by sensors, by a user entering information, or as the results of an executed computer program to mention a few examples.

In the example of FIG. 3, the inventory-related values are numerical values, logical values, or other values (numbers, integers) including shelf availability 302, back room binning activity 304, on-shelf customer availability 306, an inventory value 308, a forecast accuracy 310, a sales volume 312, a turnover amount 314, a store manager verification of under stock or overstock 316, a percentage of inventory in a back room 318, a store size 320, a store size class 322, and a store inventory accuracy 324.

A user dynamically selects the values 302, 304, 306, 308, 310, 312, 314, 316, 318, 320, 322, and 324 they wish to use in determination of the confidence score. The user also determines the priority (or weight) to assign each selected value.

A data structure 350 is used to capture and store the choices made by the user and includes a first row 352 that represents a particular selected value. In the present example, the values or parameters are the inventory value 308, the forecast accuracy 310, and the store size 320. As mentioned, the number and amount of inventory-related values is dynamically changeable by a user.

A second row 354 includes the priority (1-3). This is dynamically changeable by a user or it may be changed automatically. In this example, the inventory value 308 is first priority, a forecast accuracy 310 is third, and store size 320 is second in priority.

The actual values of the inventory-related values are shown in a third row 356. In this example, all values for all parameters (an inventory value 308, a forecast accuracy 310, and store size 320) are scaled so that all actual values are mapped onto the same scale. A median value (represented by a dotted line 358) is also shown. In this example, a scale is 0-10 with 5 being the median value is used.

In the example of FIG. 3, the inventory value 308 has a value of 370, the forecast accuracy 310 has a value of 372, and the store size 320 has a value of 374. In one specific example, the inventory value is $5 million dollars and this maps to a scaled value of 8 (shown as point 370). The forecast accuracy is 95% and this maps to a scaled value of 9 (shown as point 372). The store size is 500,000 square feet and this maps to a scaled value of 6 (shown as point 374).

In determining a confidence score, for each inventory-related value selected by the user, a priority weight is multiplied by the scaled actual amount of the inventory-related value. Then, the products are summed to obtain the confidence score.

In this example, assume that first priority has a weight of 10, second a weight of 5, and third a weight of 1. Then, the weighted sum (confidence score) is 8(10)+9(5)+6(1)=131. This score (131) may be used as an index value to a look-up table where one or more PI adjustment programs are authorized based upon the value.

Figure 4:
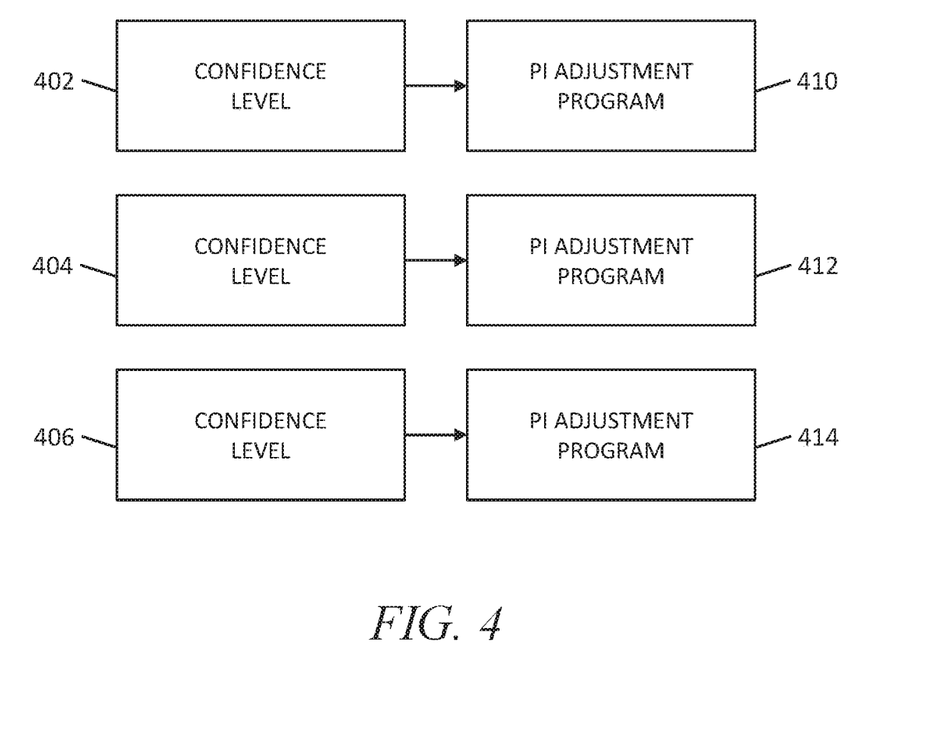
FIG. 4 is a block diagram of a data structure used in determining whether to allow a retail store to adjust the PI value of a product in accordance with some embodiments.

Referring now to FIG. 4, one example of a data structure 400 that programmatically links confidence levels to PI adjustment programs is described. A first confidence level 402 or range of levels maps to a first PI program or group of programs 410. Mapping may be with any appropriate data construct such as with pointers, links, tables, or a linked list.

A second confidence level 404 or range of values maps to a second PI program 412. A third confidence level 406 maps to a third PI program or group of programs 414.

In aspects, the programs (or group of programs) 410, 412, and 414 may be different programs. In other examples, the programs (or group of programs) 410, 412, and 414 may have components that overlap. For instance, when each of the elements 410, 412, and 414 are groups of programs (e.g., each has two or more programs), each grouping 410, 412, and 414 may have individual programs that are contained in others of the groupings. To take specific example, grouping 410 may include PI adjustment programs A and B, grouping 412 may include PI adjustment programs B and C, and grouping 414 may include PI adjustment programs C and D.

It will be appreciated that the data structure 400 is dynamic. That is, a user can easily change the data structure and its contents (e.g., change confidence levels or mappings) as circumstances change. Consequently, the use of a dynamic data leads to improved system performance and efficiency as mappings can be fine-tuned over time.

Figure 5:
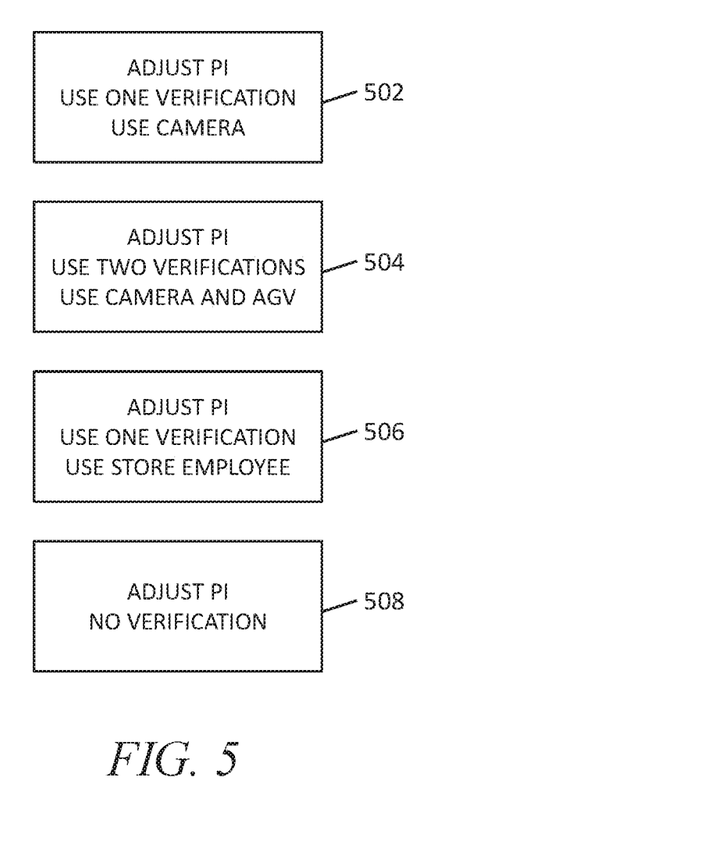
FIG. 5 is a block diagram of a mapping between confidence levels in a retail store and PI adjustment programs in accordance with some embodiments.

Referring now to FIG. 5, one example of PI adjustment programs that are stored in memory is described. These are stored in memory 500 and include a first PI adjustment program 502, a second PI adjustment program 504, a third PI adjustment program 506, and a fourth PI adjustment program 508. It will be appreciated that these are only examples, and that other examples are possible.

The first PI adjustment program 502 adjusts the PI value of a product upon the occurrence of a nil pick, and includes one verification (by fixed camera). The second PI adjustment program 504 adjusts the PI value of a product upon the occurrence of a nil pick, and includes two verification (by fixed camera and automated vehicle).

The third PI adjustment program 506 adjusts the PI value of a product upon the occurrence of a nil pick, includes one verification (by a store employee). The fourth PI adjustment program 508 adjusts the PI value of a product upon the occurrence of a nil pick, includes no verifications. When this program is selected there is a very high degree of confidence in the store making the PI value adjustment.

In one example, a first confidence level (or range of confidence levels) maps to the first PI adjustment program 502, a second confidence level (or range of confidence levels) maps to the second PI adjustment program 504, a third confidence level (or range of confidence levels) maps to the third PI adjustment program 506, and a fourth confidence level (or range of confidence levels) maps to the fourth PI adjustment program 508.

It will be appreciated that the above example is a one-to-one mapping (i.e., a confidence level or range of levels maps to a single PI adjustment program). However, in other examples, a confidence level or range of levels maps to multiple PI programs that in some aspects are executed sequentially.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system that determines the application of perpetual inventory (PI) adjustment programs in retail stores, the system comprising:

an electronic communication network;

a retail store with a transmitter that is configured to transmit one or more inventory-related values obtained by the sensors from the retail store to the network;

a plurality of electronic sensors disposed at the retail store;

an interface coupled to the network and disposed at a central processing center, the interface having a transceiver circuit that receives the one or more inventory-related values from the retail store via the network, at least some of the inventory-related values having a time stamp;

a database that is configured to store the inventory-related values;

a control circuit that is coupled to the database, the control circuit is at the central processing center and is configured to:

receive the inventory-related values from the database;

dynamically assign a priority to each of the inventory-related values;

determine a confidence score, the confidence score being the trust given to a retail store in making an adjustment to a PI value, the confidence score based upon an evaluation of all of the prioritized inventory-related values, the score determined based at least in part upon an evaluation of time stamps of some of the inventory-related values;

based upon the confidence score, select and authorize utilization of one or more electronic PI programs for the retail store, the electronic PI programs causing at least one PI value to be adjusted, the electronic PI program being chosen using a mapping data structure in the database that maps dynamically changeable confidence scores to dynamically changeable suites of electronic PI programs;

wherein selected ones of the electronic PI programs perform a verification of whether the product is located in the retail store, the verification being performed by a sensing device that is used to determine whether the product is in the retail store;

wherein the number of inventory-related values used and the priorities for these values are dynamically changeable.

2. The system of claim 1, wherein the inventory-related values are values selected from the group consisting of: shelf availability, back room binning activity, on-shelf customer availability, an inventory value, a forecast accuracy, a sales volume, a turnover amount, a store manager verification of under stock or overstock, a percentage of inventory in a back room, a store size, a store size class, and a store inventory accuracy.

3. The system of claim 1, wherein the score is determined by the control circuit based upon a weighted sum of the prioritized inventory-related values.

4. The system of claim 3, wherein the control circuit determines a scaled value for each of the prioritized inventory-related values.

5. The system of claim 1, wherein the time stamp indicates when a process was used or when the inventory-related value was obtained.

6. The system of claim 1, wherein the sensing device is a camera.

7. The system of claim 1, wherein the sensing device is disposed at an automated vehicle.

8. The system of claim 1, wherein at least one of the electronic PI programs performs multiple verifications.

9. The system of claim 1, wherein at least one of the electronic PI programs performs a single verification.

10. A method for determining the application of perpetual inventory (PI) adjustment programs in retail stores, the method comprising:

transmitting one or more inventory-related values from a retail store to a central processing center via a network;

receiving the one or more inventory-related values from the retail store at the central processing center, and storing the inventory-related values in a database, at least some of the inventory-related values having a time stamp;

dynamically assigning a priority to each of the inventory-related values;

determining a confidence score, the confidence score being the trust given to a retail store in making an adjustment to a PI value, the confidence score based upon an evaluation of all of the prioritized inventory-related values, the score determined based at least in part upon an evaluation of time stamps of some of the inventory-related values;

based upon the confidence score, selecting and authorizing utilization of one or more electronic PI programs for the retail store, the electronic PI programs causing at least one PI value to be adjusted, the electronic PI program being chosen using a mapping data structure in the database that maps dynamically changeable confidence scores to dynamically changeable suites of electronic PI programs;

wherein selected ones of the PI programs perform a verification of whether the product is located in the retail store, the verification being performed by a sensing device to determine whether the product is in the retail store;

wherein the number of inventory-related values used and the priorities for these values are dynamically changeable.

11. The method of claim 10, wherein the inventory-related values are values selected from the group consisting of: shelf availability, back room binning activity, on-shelf customer availability, an inventory value, a forecast accuracy, a sales volume, a turnover amount, a store manager verification of under stock or overstock, a percentage of inventory in a back room, a store size, a store size class, and a store inventory accuracy.

12. The method of claim 10, wherein the score is determined by the control circuit based upon a weighted sum of the prioritized inventory-related values.

13. The method of claim 12, further comprising determining a scaled value for each of the prioritized inventory-related values.

14. The method of claim 10, wherein the time stamp indicates when a process was used or when the inventory-related value was obtained.

15. The method of claim 10, wherein the sensing device is a camera.

16. The method of claim 10, wherein the sensing device is disposed at an automated vehicle.

17. The method of claim 10, wherein at least one of the electronic PI programs performs multiple verifications.

18. The method of claim 10, wherein at least one of the electronic PI programs performs a single verification.

* * * * *